US012596760B2

(12) United States Patent
Pande et al.

(10) Patent No.: US 12,596,760 B2
(45) Date of Patent: *Apr. 7, 2026

(54) COLLABORATIVE COMMENT ANALYSIS AND MODIFICATION TO CONTENT

(71) Applicant: Adeia Guides Inc., San Jose, CA (US)

(72) Inventors: Siddhartha Pande, Bengaluru (IN); Deviprasad Punja, Bangalore (IN); Madhusudhan Srinivasan, Bangalore (IN)

(73) Assignee: Adeia Guides Inc., San Jose, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 18/666,051

(22) Filed: May 16, 2024

(65) Prior Publication Data

US 2024/0303289 A1      Sep. 12, 2024

Related U.S. Application Data

(63) Continuation of application No. 17/546,782, filed on Dec. 9, 2021, now Pat. No. 12,013,909, which is a continuation of application No. 16/655,788, filed on Oct. 17, 2019, now Pat. No. 11,227,024.

(51) Int. Cl.
| | |
|---|---|
| *H04N 21/25* | (2011.01) |
| *G06F 16/9536* | (2019.01) |
| *H04N 21/45* | (2011.01) |
| *H04N 21/466* | (2011.01) |

(52) U.S. Cl.
CPC ....... *G06F 16/9536* (2019.01); *H04N 21/252* (2013.01); *H04N 21/4532* (2013.01); *H04N 21/4661* (2013.01)

(58) Field of Classification Search
None
See application file for complete search history.

(56) References Cited

U.S. PATENT DOCUMENTS

| | | | | |
|---|---|---|---|---|
| 12,013,909 B2 * | 6/2024 | Pande | ................ | H04N 21/4532 |
| 2013/0155071 A1 * | 6/2013 | Chan | ..................... | G06T 13/00 |
| | | | | 345/473 |
| 2014/0115476 A1 * | 4/2014 | Fink | ................. | H04N 21/25875 |
| | | | | 715/720 |
| 2014/0325552 A1 * | 10/2014 | Evans | ................. | G06F 16/9558 |
| | | | | 725/28 |
| 2019/0179916 A1 * | 6/2019 | Sivaji | ..................... | G06F 16/34 |

* cited by examiner

*Primary Examiner* — Benjamin R Bruckart
*Assistant Examiner* — Charles N Hicks
(74) *Attorney, Agent, or Firm* — HG LAW LLP

(57) ABSTRACT

Systems and methods for analyzing collaborative comments on content to create and/or modify content are disclosed herein. Each of the plurality of comments include modifying the content. Each of the plurality of comments are is analyzed to identify an action associated with each of the plurality of comments, location of the action in the content, and an owner associated with the action. Furthermore, a marker associated with the action at the identified location in the content is added.

20 Claims, 5 Drawing Sheets

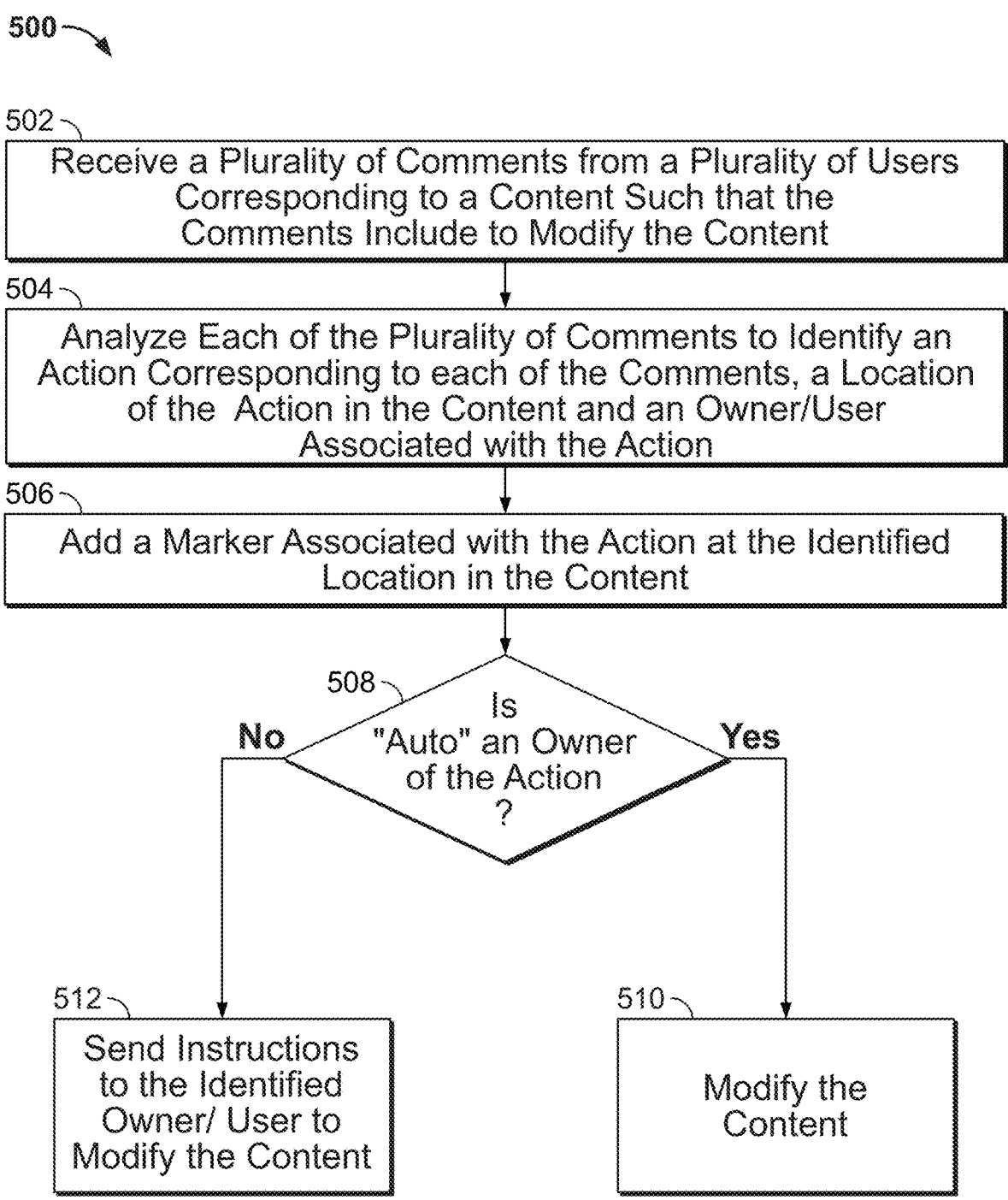

500

502
Receive a Plurality of Comments from a Plurality of Users Corresponding to a Content Such that the Comments Include to Modify the Content 504
Analyze Each of the Plurality of Comments to Identify an Action Corresponding to each of the Comments, a Location of the Action in the Content and an Owner/User Associated with the Action 506
Add a Marker Associated with the Action at the Identified Location in the Content 508
Is "Auto" an Owner of the Action ?

No          Yes

512
Send Instructions to the Identified Owner/ User to Modify the Content

510
Modify the Content

FIG. 5

COLLABORATIVE COMMENT ANALYSIS AND MODIFICATION TO CONTENT

CROSS-REFERENCE TO RELATED APPLICATIONS

This application is a continuation of U.S. patent application Ser. No. 17/546,782, filed Dec. 9, 2021, is a continuation of U.S. patent application Ser. No. 16/655,788, filed Oct. 17, 2019, now U.S. Pat. No. 11,227,024, the disclosure of which is hereby incorporated by reference herein in their entireties.

BACKGROUND

The present disclosure relates to comment analysis and modification to content, and more particularly to systems and related processes for analyzing collaborative comments on content to create and/or modify content.

SUMMARY

Some collaborative tools allow users to comment on content such as a document, audio, video, audio/video, media and/or an image. Such comments are simply shared among the users with a request to edit/modify the content. In many instances, however, no action is readily taken on these comments. In some instances, multiple users may wish to take ownership over the comment on the content and edit the content regardless of whether they are authorized to do so or not. In other instances, users spend an enormous amount of time searching for the exact location in the content to edit or modify, especially when a user does not include his/her comment in the content itself.

In view of the foregoing, the present disclosure provides systems and related methods that analyze comments on the content to identify a type of action to execute on the content, a location of the action in the content and an owner/user who will execute the action. In addition, the systems and methods described herein mark a portion of the content at the identified location in order to make it easy for a user to find the exact location in the content to execute the action.

BRIEF DESCRIPTION OF THE DRAWINGS

The above and other objects and advantages of the disclosure will be apparent upon consideration of the following detailed description, taken in conjunction with the accompanying drawings, in which:

FIG. 5 depicts an illustrative flowchart of a process for providing collaborative comment analysis and modification for content in accordance with some embodiments of the disclosure.

DETAILED DESCRIPTION

Methods and system are disclosed herein for providing collaborative comment analysis on content and modifications to the content. In one embodiment, a collaborative platform collects comments on content from various users, which are analyzed by the system to determine what type of action to execute on the content, a location in the content to execute the action and the user who will execute the action. Also, the system adds a marker at a location of the content where the action is required in order to make it readily and easily available for the user to execute the action.

Figure 1:
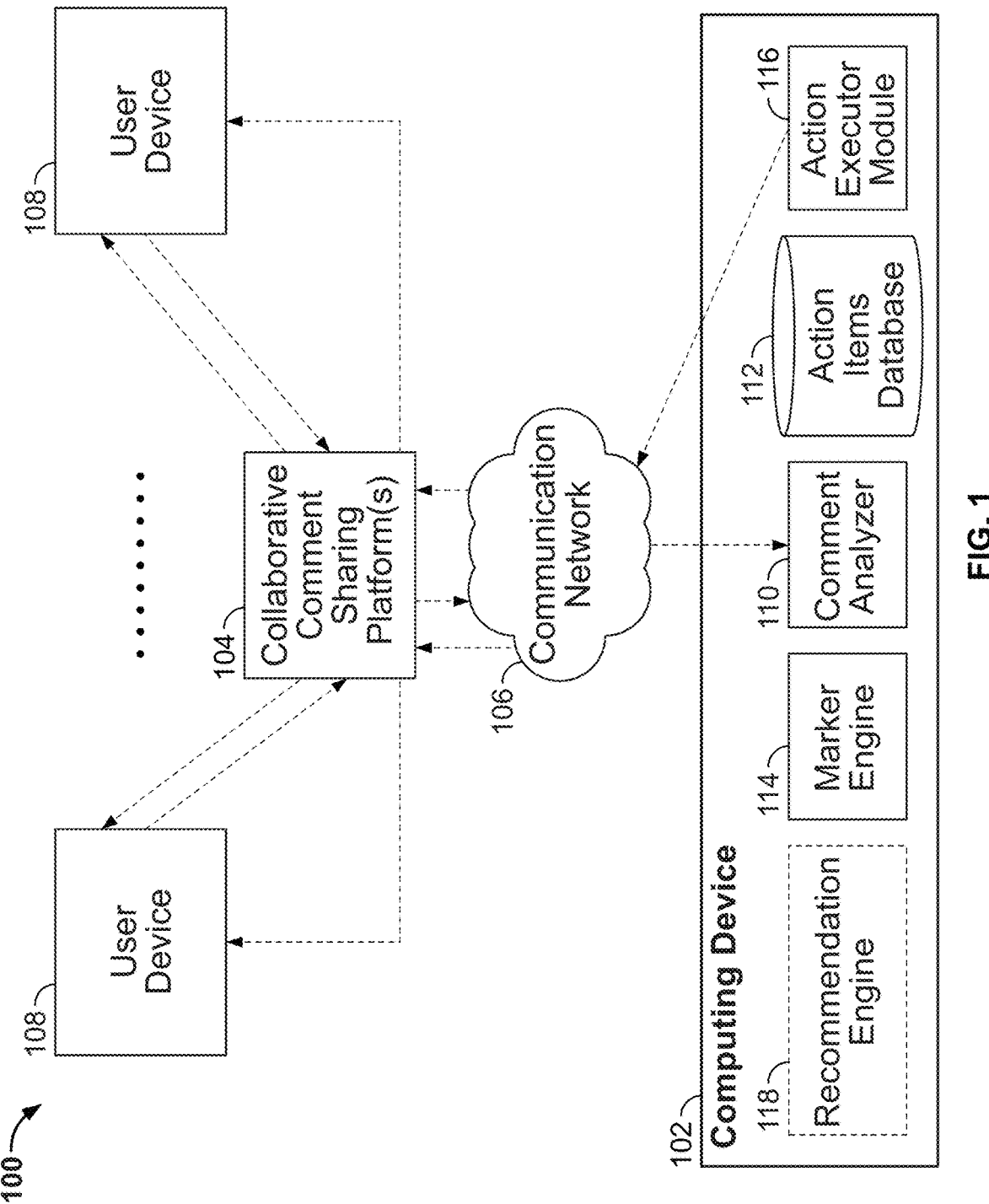
FIG. 1 shows an illustrative block diagram of a system for providing collaborative comment analysis and modification for content in accordance with some embodiments of the disclosure.

FIG. 1 shows an illustrative block diagram of a system for providing collaborative comment analysis and modification in accordance with some embodiments of the disclosure. Although FIG. 1 shows system 100 as including a number and configuration of individual components, in some embodiments, any number of the components of system 100 may be combined and/or integrated as one device. System 100 includes computing device 102, one or more collaborative comment sharing platform(s) 104, user devices 108, and communication network 106. Computing device 102 and user devices 108 are communicatively coupled to the platform(s) 104 via communication network 106. Communication network 106 may be any type of communication network, such as the internet communication (IC), a mobile phone network, a mobile voice or data network (e.g., a 5G network), a cable network, a public switched telephone network, or any combination of two or more of such communication networks. Communication network 106 includes one or more communication paths, such as a satellite path, a fiber-optic path, a cable path, a path that supports internet communications (e.g., IPTV), free-space connections (e.g., for broadcast or other wireless signals), or any other suitable wired or wireless communication path or combination of such paths.

Although FIG. 1 shows direct communication of computing device 102 to the collaborative comment sharing platform ("platform") 104, one skilled in the art would appreciate that the computing device 102 may communicate with platform 104 via a communications network (not shown) similar to the communication network 106 discussed above. Computing device 102 includes comment analyzer 110, an action items database 112, a marker engine 114 and an action executor module 116. Users generate comments on one or more content via their respective user devices 108. Such content may be text, audio, video, audio/video, image content or any other type of content. In one example, the user devices 108 may include any "electronic device" utilized by the users to generate and send comments on the content. In one example, the user may generate and send comments on a content. In another example, the user devices 108 may receive comments on a content and/or action related to the content. User devices 108 may function as standalone devices or may be part of a network of devices, Some examples of user devices 108 include user computer equipment devices such as a personal computer, laptop, desktop, etc., wireless user communications devices such as PDA, mobile smartphone, etc, and/or user television equipment devices such as a Smart TV, a streaming media device, a media player, a media recorder, etc. The user may generate comments via any type of data such as text (emails, sms messages, social media interaction, and instant messaging), voice, video, etc.

In one embodiment, these comments are sent to the platform 104 by the user device(s) 108. The platform 104 transmits the comments to the computing device 102 via the communication network 106. In another embodiment, these comments are uploaded to the platform 104 for access by the computing device 102 via the communications network 106. In one embodiment, the platform 104 is any type of communications platform (e.g. a social media website or application), which allows one or more users to share and collaborate their comments on content with multiple other users. In one example, the content is media content and the comment on the content is open to all users in the platform 104 (See, e.g., FIG. 3). In another example, the content is a word document and the comment on the content is addressed to a specific user in the platform 104 (See, e.g., FIG. 4). Each of the comments may include modifying the one or more content. Comment analyzer module 110 utilizes known action items and parameters corresponding to the known action items stored in the action items database 112 to analyze these comments to identify an action associated with each of the comments, location of the action in the content, and an owner/user associated with the action. The action items database 112 stores the known action items and parameters such as location of the action item, owner/user corresponding to each of the known action items, and a value optionally provided for the comment. Such value may for example be part of the action in the comment or means to locate the comment. In one embodiment, the comment analyzer 110 functions as a natural language processor (NLP) to parse the comments. In another embodiment, the comment analyzer 110 utilizes the action items database 112 to identify an action corresponding to each of the comments, a location of the action in the content and an owner/user corresponding to the action.

In one embodiment, the marker engine 114 adds a marker corresponding with the action in the identified location of the content. The marker pinpoints exactly where in the content to execute the action. The marker may be added without the user inserting any comment corresponding to the action in the content itself. For example, a user may send a comment to execute an action on a specific location in the content such as a document via an e-mail communication without the user inserting the comment in the document. The marker engine 114 adds a marker such as highlighting a portion at the location in the document where the action is required. In one example, the marker may include a hyperlink, which leads you to the portion of the document where the action is required. In other examples, the marker may be added at the location in the document where the action is required even if the user inserted the comment corresponding to the action in the document, but not inserted the location where the action is required. In another embodiment, the marker engine 114 changes the mark corresponding with the action in the identified location of the content. For example, a user may insert a comment to continue with an action on the content having a marker at a location where the user stopped. The marker engine 114 may change or replace the marker with another marker for another user to continue with the action on the content at the exact location where the first or previous user stopped. The action executor module 116 either executes the action or sends a command to execute the action based on the identified owner/user of the action. Alternatively, the computing device 102 may also include a recommendation engine 118 configured to recommend alternate or additional actions with respect to the content. Additional details regarding the features and functionality of system 100 are provided below.

Figure 2:
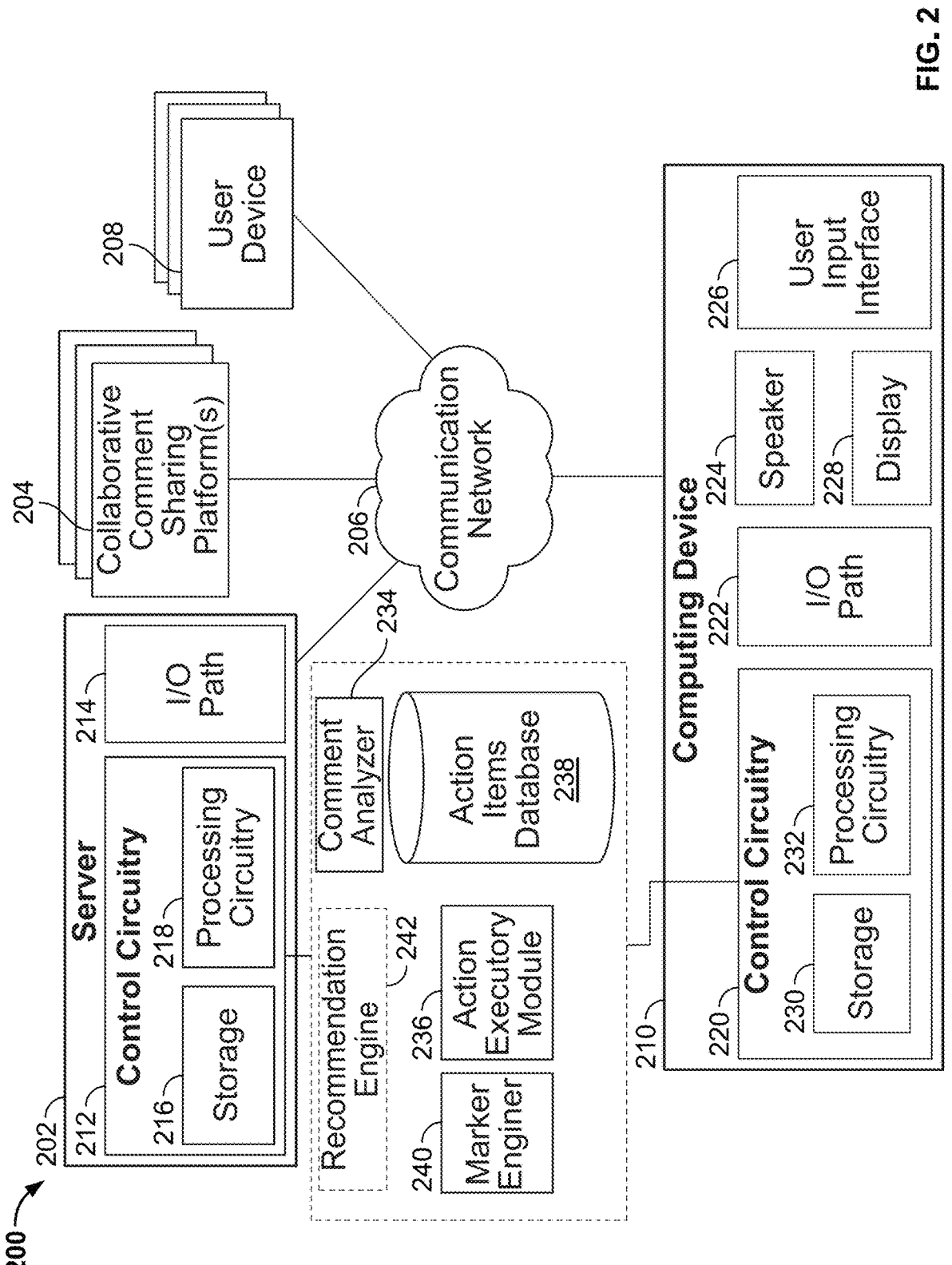
FIG. 2 is an illustrative block diagram showing additional details of the system of FIG. 1, in accordance with some embodiments of the disclosure.

FIG. 2 is an illustrative block diagram showing system 200, which shows additional details of the system 100 of FIG. 1, in accordance with some embodiments of the disclosure. Although FIG. 2 shows certain numbers of components, in various examples, system 200 may include fewer than the illustrated components and/or multiples of one or more illustrated components. System 200 includes server 202, computing device 210, comment sharing platform(s) ("platform(s)") 204, user device(s) 208, each communicatively coupled to communication network 206, which may be the Internet or any other suitable network or group of networks. In some embodiments, system 200 excludes server 202 and functionality that would otherwise be implemented by server 202 is instead implemented by other components of system 200, such as computing device 210. In still other embodiments, server 202 works in conjunction with computing device 210 to implement certain functionality described herein in a distributed or cooperative manner.

Server 202 includes control circuitry 212 and I/O path 214, and control circuitry 212 includes storage 216 and processing circuitry 218. Computing device 210, which may be a personal computer, a laptop computer, a tablet computer, a smartphone, or any other type of computing device, includes control circuitry 220, I/O path 222, speaker 224, display 228, and user input interface 226. Control circuitry 220 includes storage 230 and processing circuitry 232. Control circuitry 212 and/or 220 may be based on any suitable processing circuitry such as processing circuitry 218 and/or 232. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 220 and/or control circuitry 212 are configured to implement comment analyzer module 110, an action items database 112, a marker engine 114 and action executor module 116 and alternatively a recommendation engine 118 described above in connection with FIG. 1.

Each of storage 216, storage 230, and/or storages of other components of system 200 (e.g., storages of collaborative comment sharing platform(s) 204, user devices 208, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 216, storage 230, and/or storages of other components of system 200 may be used to store various types of content, metadata, and or other types of data. Non-volatile memory may also be used (e.g., to launch a boot-up routine and other instructions). Cloud-based storage may be used to supplement storages 216, 230 or instead of storages 216, 230. In some embodiments, control circuitry 212 and/or 220 executes instructions for an application stored in memory (e.g., storage 216 and/or 230). Specifically, control circuitry 212 and/or 220 may be instructed by the application to perform the functions discussed herein. In some implementations, any action performed by control circuitry 212 and/or 220 may be based on instructions received from the application. For example, the application may be implemented as software or a set of executable instructions that may be stored in storage 216 and/or 230 and executed by control circuitry 212 and/or 220. In some embodiments, the application may be a client/server application where only a client application resides on computing device 210, and a server application resides on server 202.

The application may be implemented using any suitable architecture. For example, it may be a stand-alone application wholly implemented on computing device 210. In such an approach, instructions for the application are stored locally (e.g., in storage 230), and data for use by the application is downloaded on a periodic basis (e.g., from an out-of-band feed, from an Internet resource, or using another suitable approach). Control circuitry 220 may retrieve instructions for the application from storage 230 and process the instructions to perform the functionality described herein. Based on the processed instructions, control circuitry 220 may determine what action to perform when input is received from user input interface 226.

In client/server-based embodiments, control circuitry 220 may include communication circuitry suitable for communicating with an application server (e.g., server 202) or other networks or servers. The instructions for carrying out the functionality described herein may be stored on the application server. Communication circuitry may include a cable modem, an integrated service digital network (ISDN) modem, a digital subscriber line (DSL) modem, a telephone modem, an Ethernet card, or a wireless modem for communication with other equipment, or any other suitable communication circuitry. Such communication may involve the Internet or any other suitable communication networks or paths (e.g., communication network 206). In another example of a client/server-based application, control circuitry 220 runs a web browser that interprets web pages provided by a remote server (e.g., server 202). For example, the remote server may store the instructions for the application in a storage device. The remote server may process the stored instructions using circuitry (e.g., control circuitry 212) and/or generate displays. Computing device 210 may receive the displays generated by the remote server and may display the content of the displays locally via display 228. This way, the processing of the instructions is performed remotely (e.g., by server 202) while the resulting displays, such as the display windows described elsewhere herein, are provided locally on computing device 210. Computing device 210 may receive inputs from the user via input interface 226 and transmit those inputs to the remote server for processing and generating the corresponding displays.

A user may send comments (for instance, instructions to generate and/or upload comments to the platform(s) 204 via communication network 206) to control circuitry 212 and/or 220 using user input interface 226. User input interface 226 may be any suitable user interface, such as a remote control, trackball, keypad, keyboard, touchscreen, touchpad, stylus input, joystick, voice recognition interface, a gaming controller, or other user input interfaces. User input interface 226 may be integrated with or combined with display 228, which may be a monitor, a television, a liquid crystal display (LCD), electronic ink display, or any other equipment suitable for displaying visual images.

Server 202 and computing device 210 may transmit and receive comments and data via input/output (hereinafter "I/O") path 214 and 222, respectively. For instance, I/O path 222 and/or I/O path 214 may include a communication port configured to upload comments to the platform(s) 204 via communication network 206 and send instructions to execute an action on the comment from computing devices 210 via the communication network 206. Control circuitry 212, 220 may be used to send and receive instructions, commands, requests, and other suitable data using I/O paths 214, 222.

In one example, comments sent by the user may be embedded in the content. In another example, comments are in the body of an e-mail, messaging or other communication attached with the content. In a further example, the comments are sent in freeform channels such as social media platforms. Some typical examples of comments to modify content may include following:

Please spellcheck Section 3 Lines 3 to 10

Please change color for Section 4 to Red

Please sing from the line "How I wonder What you Are."

In one embodiment, the control circuitry 212, 220 retrieves the above comments from the users of the user device(s) 208. The control circuitry 212, 220 may parse these comments using a natural language parser processing. The action items database 112 stores actions and parameters such as location, value and owner/user corresponding to each of the actions. The control circuitry 212, 220 may search in the actions items database 112 to identify the action, location of the action, owner assigned to the action and value if any assigned to of the action for the above typical example of comments. Thus, for the above typical examples of comments, the action items database 112 may include the edit to the content followed by the set of parameters and its replacements as shown below:

For example, "Please spellcheck Section 3 Lines 3 to 10" would be parsed to:
Location: Section 3 to 10, Action=Spell check, Owner=Auto For example, "Please change color for Section 4 to Red" would be parsed to:
Location: Section 4, Action=Change Color; Value=Red, Owner=Auto For example, "Please sing from the line "How I wonder What you Are." I missed to sing it.
Location: Time offset: 24 min to start; Action=Change color; Value=Blue, Owner=Content_owner.

In one embodiment, the control circuitry 212, 220 adds a marker at the location of the content where the action is required. For the above example, "Please change color for Section 4 to Red," a marker with a value of color Red is added to the location, Section 4 in the content. Accordingly, Section 4 of the content where the action of changing color to Red is highlighted. In another embodiment, the control circuitry 212, 220 replaces the marker at the location of the content where the action is required. For the above example, "Please sing from the line "How I wonder What you are" includes changing the value to color Blue at location of 24 minutes. In this example, a marker with a value of color Orange, includes content of a song sung by a first user (who sent the comment) up to 24 minutes from the start and the action is to change the value of the marker with color Blue at the location of 24 minutes of the song in order to highlight the location where the action is required in the song. This enables a second user to identify exactly where to continue singing from the point the first user stopped.

In one embodiment, the control circuitry 212, 220 registers different types of applications in the action executor module 116 to execute the actions stored in the action items database 112. Some examples of types of applications include text, audio, video, audio/video image, and multimedia application. The control circuitry 212, 220 determines a type of application to utilize to execute the identified action based on the type of action. The control circuitry 212, 220 invokes the application based on the type of action and the owner of the action. For the above identified example in which the action is "Spellcheck," the control circuitry 212, 220 determines the application to be the text application and the owner to be "Auto," the control circuitry 212, 220 invokes this text application to automatically execute the "Spellcheck" action. In another example above in which the action is "Sing . . . ," the control circuitry 212, 220 determines the application to be an audio application and the owner to be "Content_owner" such as a user, the control circuitry 212, 220 sends a command to the user to execute the action. In one example, the control circuitry provides a list of actions to the user device 208 of the user.

In some embodiments, the control circuitry 212, 220 determines whether the content on which the action(s) is to be executed is sent by the user of user device 208. In one example, the content is a word document and is sent via a link. In another example, the content is a word document stored in a folder in a computer and location of folder is provided in the comment. In another example, the content is a word document and is sent in an e-mail chain. In a further example, the content is a word document and is sent along with other documents attached in an e-mail chain or via the link. The control circuitry 212, 220 analyzes the comments to determine whether the comments include any direct reference to a specific document. For example, the content is in a word document, which is sent in the e-mail chain. The control circuitry 212, 220 searches for the words such as "attached" or like in the e-mail chain to determine that the content is in the e-mail chain. If the control circuitry 212, 220 determines that the comments include the direct reference to the specific document, then the control circuitry 212, 220 executes the action on the specific document. If the control circuitry 212, 220 does not determine that the comments include the direct reference to the specific document, then the control circuitry 212, 220 compares the text in the comment(s) with a list of documents to determine a semantic match of the comment(s). The control circuitry 212, 220 identifies a document among the list of documents referenced by the comment(s) when the semantic match of the comment with the document is above a semantic threshold. The control circuitry 212, 220 executes the action on the identified document. In one embodiment, the semantic threshold is pre-determined by the control circuitry 212, 220. For example, the comment includes an action of "Start the line with bla bla bla as a new paragraph." In one embodiment, the control circuitry 212, 220 compares the words "bla bla bla" from the comment to words in the list of documents to identify a document among the list of documents having words same as or similar to "bla bla bla." In one embodiment, the control circuitry 212, 220 identifies a document among the list of documents that includes words same as or similar to "bla bla bla" and thus the document is determined to have the best sematic match. In one embodiment, the control circuitry 212, 220 executes the action of "Start the line with bla bla bla as a new paragraph" in the identified document.

In some embodiments, the control circuitry 212, 220 may recommend an alternate or different action for the comment than the action stored in the database. In one embodiment, the control circuitry 212, 220 determines that the action results in a different representation of the content. For example, when the stored action results in a video with modified aspect/title etc., the control circuitry 212, 220 may recommend an alternate action to the comment, which when executed results in the video with unchanged aspects/titles. In another example, when an old content is generated with subtitles fixed for a given language, the control circuitry 212, 220 may recommend new content to replace the old content for the language-based recommendations that have the fixed subtitles. Accordingly, the control circuitry 212, 220 not only recommends the alternate action to replace the old content with new content but also recommends the content itself. In some embodiments, the control circuitry 212, 220 may recommend additional data for the action stored in the database. For example, when the content is generated for a new screen form factor, the control circuitry can recommend devices with the new screen form factor.

In some embodiments, the control circuitry 212, 220 may mark the location or segment of the content and also take the required action. The control circuitry 212, 220 may highlight the content in some manner, (e.g. color), to indicate action taken. The control circuitry 212, 220 may allow a user to accept auto taken actions or undo the action auto taken or recommend appropriate action to be taken based on analysis of the comments.

Figure 3:
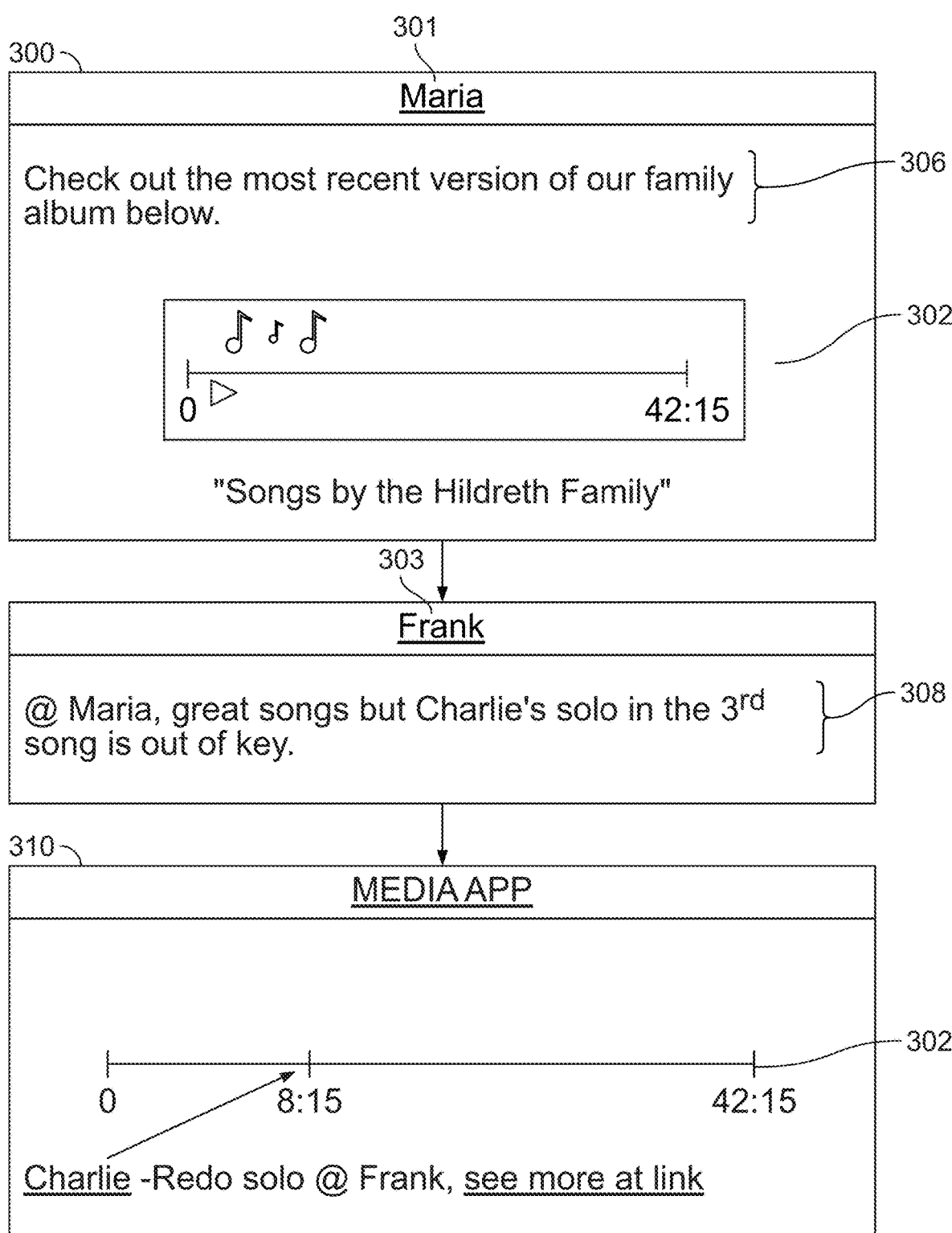
FIG. 3 illustrates an example of providing collaborative comment analysis for modification of media content via a social media platform in accordance with some embodiments of the disclosure.

FIG. 3 illustrates an example of providing collaborative comment analysis for modification of media content via a social media platform 300 in accordance with some embodiments of the disclosure. The example illustrates two users, Maria 301 and Frank 303, sharing their comments on music media content 302 via the social media platform 300. The user Maria 301 uploads music media content 302 and provides a comment 306 of "Check out the most recent version of our family album." The music media content 302 is entitled: "Songs by the Hildreth Family." The user Frank 303 listens to the music media content 302 and provides a comment in response to using social media platform 300. As shown, the user Frank 303 provides the following comment 308: "@ Maria, great songs but Charlie's solo in the third song is out of key. In one embodiment, the comments 306 and 308 are received by the platform 204 of FIG. 2. In one embodiment, the control circuitry 212, 220 retrieves comments 306 and 308 and parses these comments using the natural language parser processing. The control circuitry 212, 220 may search in the actions items database 112 to identify the action, location of the action, owner assigned to the action and a value assigned to the action based on the comments from 306 and 308. Thus, for the above example of comments 306 and 308, the action items database 112 may include a suggested edit to the audio in the music media content 302 followed by the set of parameters and its replacements such as Location: Time offset: 8:15 min to start; Action=Redo solo @ Frank, Owner=Charlie; Value=See more at the hyperlink In the above example, where the action is "Redo solo . . . ,", the owner is Charlie. The control circuitry 212, 220 may either send a command to Charlie utilizing a media application 310 with the music media content 302 including the parameters to Charlie to execute the action or provide this action including the parameters to Charlie on his user device.

Figure 4:
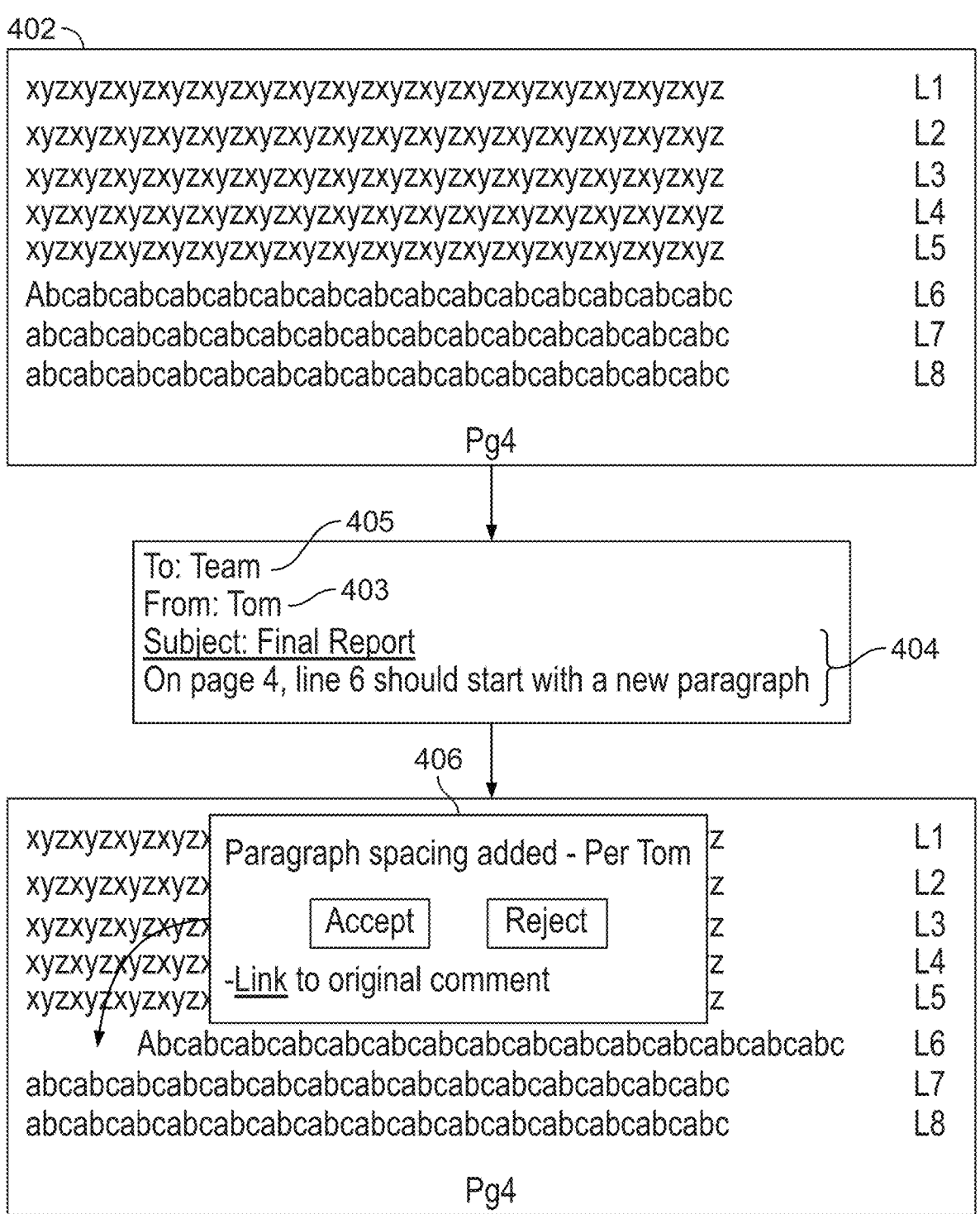
FIG. 4 illustrates an example of providing collaborative comment analysis for modification of a word document in accordance with some embodiments of the disclosure.

FIG. 4 illustrates an example of providing collaborative comment analysis for modification of a word document 402 in accordance with some embodiments of the disclosure.

The example also illustrates a comment 404 in the form of an email associated with the word document 402. As shown, the email comment 404 includes "Subject: Final Report" and "On page 4, line 6 should start with a new paragraph." The email comment is from a user Tom 403 to a user group Team 405. In one embodiment, this email comment 404 is received by the platform 204. The control circuitry 212, 220 may retrieve the comment 404 and parse the comment using the natural language parser processing. The control circuitry 212, 220 may search in the action items database 112 to identify the action, location of the action, owner assigned to the action and a value assigned to the action based on the comment 404. Thus, for the above example of the email comment 404, the action items database 112 may include an edit to the word document 402 followed by the set of parameters and its replacements such as Location: Page 4, line 6, Action=New Paragraph with option to Accept or Reject, Owner=Auto, Value=See link to the original document.

In the above example, where the action is "New Paragraph . . . ", the control circuitry 212, 220 determines the application to be the text application and the owner to be "Auto." In one embodiment, the control circuitry 212, 220 checks if the word document 402 was attached in an e-mail chain. For example, the control circuitry 212, 220 checks for words like "attached" in the e-mail chain. In one example, the e-mail chain includes only one document, the word document 402. In another example, the e-mail chain may include two or more documents including the word document 402. The control circuitry 212, 220 analyzes the comment 404 to identify the word document 402 from the two or more documents in the e-mail chain. As discussed above, the control circuitry 212, 220 compares the words from the comment 404 to identify the word document 402 among the two or more documents on which to execute the action. So, for the above example, the control circuitry 212, 220 may compare words such as "Final Report" in the comment with the words in the two or more documents to determine best semantic match to execute the action. In one embodiment, the control circuitry 212, 220 identifies the word document 402 among the two or more documents as the best sematic match based on the semantic threshold and executes the "New Paragraph . . . " action in the word document 402. In one embodiment, the control circuitry 212, 220 invokes the text application to automatically execute the "New Paragraph . . . " action in the word document 402. The control circuitry 212, 220 further displays a window 406 at the location in the word document 402 where the action is executed. As illustrated, the displayed window 406 may for example include completion of the action, "Paragraph spacing added—Per Tom" including the options to the user group Team 405 to either "Accept or Reject" the action including "link to original document."

Having described systems 100 and 200 and the above examples of FIGS. 3 and 4, reference is now made to FIG. 5, which depicts an illustrative flowchart of process 500 for analyzing collaborative comments on content to create and/or modify the content, which may be implemented by using system 100 and/or system 200, in accordance with some embodiments of the disclosure. In various embodiments, individual steps of process 500, or any process described herein, may be implemented by one or more components of system 100 and/or system 200. Although the present disclosure may describe certain steps of process 500 (and of other processes described herein) as being implemented by certain components of system 100 and/or system 200, this is for purposes of illustration only, and it should be understood that other components of system 100 and/or system 200 may implement those steps instead.

At 502, control circuitry 220 retrieves, for example, from the platform 204, a plurality of comments from a plurality of users corresponding to content such that the comments include to modify the content. The users may use user devices 208 to send the comments, which are collected by the platform 204. At 504, control circuitry 220 analyzes each of the plurality of comments to identify an action corresponding to each of the comments, a location of the action in the content and an owner/user associated with the content. As discussed above, the control circuitry 220 utilizes the action items database 112 to determine the action, the location and the owner. The action items database 112 includes action items and corresponding parameters to modify the content. At 506, the control circuitry 220 adds a marker associated with the action at the identified location in the content. The marker functions to highlight a portion at the identified location of the content that requires the action. At 508, the control circuitry 220 determines whether the owner of the action is "Auto." If it is determined that the owner is "Auto" ("Yes" at 508), the control circuitry 220 at 510 automatically executes the action. If it is determined that the owner is not "Auto" ("No" at 508), the control circuitry 220 at 512 sends a command to the identified owner/user to execute the action. The control circuitry 220 may also send the content with the marker to the user so that that user can readily and easily determine where exactly in the content to execute the action.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving an electronic communication comprising text;

analyzing the text of the electronic communication to identify a reference to a digital content item stored on a collaborative comment sharing platform;

analyzing the text and the digital content item to identify a proposed modification to the digital content item;

generating a digital comment, wherein the digital comment specifies: (a) an action that implements the proposed modification to the digital content item, (b) a location of the action in the digital content item, and (c) identification of a user, wherein the identification indicates the user is to execute the action;

modifying the digital content item stored on the collaborative comment sharing platform by adding a marker associated with the action at the location in the digital content, wherein the marker comprises an indication of the user who is to execute the action and an indication of the action.

2. The method of claim 1, wherein the digital content item comprises text, and wherein the marker indicates a position in the text of the digital content item and comprises:
   a description of the proposed modification to the text;
   an option to accept the proposed modification to the text;
   an option to reject the proposed modification to the text; and
   a link to the electronic communication.

3. The method of claim 1, wherein the analyzing the text of the electronic communication to identify the reference to the digital content item is executed by a trained machine learning model utilizing natural language processing.

4. The method of claim 1, further comprising automatically executing the action or sending a command to execute the action based on the user who is to execute the action.

5. The method of claim 1, further comprising storing a list of known actions and a plurality of parameters corresponding to each of the known actions and associating the generated digital comment with a known action among the list of known actions and a corresponding parameter among the plurality of parameters.

6. The method of claim 1, further comprising:
   determining that the action corresponds to a first type of application among a plurality of types of applications.

7. The method of claim 6, further comprising invoking the first type of application to automatically execute the first action or to send the first-action for execution.

8. The method of claim 6, wherein the plurality of types of applications comprises one of a text, audio, video, audio/video or image application.

9. The method of claim 1, wherein the digital content item is uploaded by a first user, and wherein the user is a second user other than the first user.

10. The method of claim 1, wherein the electronic communication is received from a device of a first user, and wherein the user is a second user other than the first user.

11. A system comprising:
   a collaborative comment sharing platform configured to store digital content items;
   a database configured to store a list of known actions and a plurality of parameters corresponding to each of the known actions; and
   control circuitry configured to:
      receive an electronic communication comprising text;
      analyze the text of the electronic communication to identify a reference to a digital content item stored on the collaborative comment sharing platform;
      analyze the text and the digital content item to identify a proposed modification to the digital content item;

generate a digital comment, wherein the digital comment specifies: (a) an action that implements the proposed modification to the digital content item, (b) a location of the action in the digital content item, and (c) identification of a user, wherein the identification indicates the user is to execute the action;
      modify the digital content item stored on the collaborative comment sharing platform by adding a marker associated with the action at the location in the digital content, wherein the marker comprises an indication of the user who is to execute the action and an indication of the action.

12. The system of claim 11, wherein the digital content item comprises text, and wherein the marker indicates a position in the text of the digital content item and comprises:
   a description of the proposed modification to the text;
   an option to accept the proposed modification to the text;
   an option to reject the proposed modification to the text; and
   a link to the electronic communication.

13. The system of claim 11, wherein the control circuitry is further configured to analyze the text of the electronic communication to identify the reference to the digital content item by executing a trained machine learning model utilizing natural language processing.

14. The system of claim 11, wherein the control circuitry is further configured to automatically execute the action or send a command to execute the action based on the user who is to execute the action.

15. The system of claim 11, wherein the control circuitry is further configured to associate the generated digital comment with a known action among the list of known actions and a corresponding parameter among the plurality of parameters.

16. The system of claim 11, wherein the control circuitry is further configured to:
   determine that the action corresponds to a first type of application among a plurality of types of applications.

17. The system of claim 16, wherein the control circuitry is further configured to invoke the first type of application to automatically execute the action or to send the action for execution.

18. The system of claim 16, wherein the plurality of types of applications comprises one of a text, audio, video, audio/video or image application.

19. The system of claim 11, wherein the digital content item is uploaded by a first user, and wherein the user is a second user other than the first user.

20. The system of claim 11, wherein the electronic communication is received from a device of a first user, and wherein the user is a second user other than the first user.

\* \* \* \* \*